US009323135B1

(12) United States Patent
Veloso

(10) Patent No.: US 9,323,135 B1
(45) Date of Patent: Apr. 26, 2016

(54) MULTI-FUNCTION FOLDABLE SUPPORT ARM

(71) Applicant: Carlos J. Veloso, Linden, NJ (US)

(72) Inventor: Carlos J. Veloso, Linden, NJ (US)

( * ) Notice: Subject to any disclaimer, the term of this patent is extended or adjusted under 35 U.S.C. 154(b) by 175 days.

(21) Appl. No.: 14/285,298

(22) Filed: May 22, 2014

(51) Int. Cl.
*G03B 17/00* (2006.01)
*G03B 17/56* (2006.01)
*F16M 13/00* (2006.01)

(52) U.S. Cl.
CPC .............. *G03B 17/561* (2013.01); *F16M 13/00* (2013.01); *G03B 17/56* (2013.01)

(58) Field of Classification Search
CPC ..... F16M 13/00; F16L 3/1091; F16L 3/2235; A47H 1/14; A47H 2001/021; H02G 3/125; H05K 5/0204; G03B 17/56; G03B 17/561
USPC ........ 248/276.1, 205.1, 544, 548, 909, 309.1; 396/419, 428; 16/221, 365, 387
See application file for complete search history.

(56) References Cited

U.S. PATENT DOCUMENTS

| | | | |
|---|---|---|---|
| 4,530,580 A | 7/1985 | Ueda et al. | |
| 4,993,670 A * | 2/1991 | Tesar ..................... | F16L 3/1091 248/68.1 |
| 5,040,316 A * | 8/1991 | Fast ....................... | A47F 5/0869 248/909 |
| 5,176,345 A * | 1/1993 | Medlin .................. | H02G 3/126 248/205.1 |
| 5,429,332 A | 7/1995 | Ishikawa | |
| 5,497,214 A | 3/1996 | Labree | |
| 5,914,171 A | 6/1999 | Morley | |
| 6,189,247 B1 * | 2/2001 | Gebka ................... | A47F 5/0869 40/642.01 |
| D460,566 S | 7/2002 | Henschel et al. | |
| 6,471,177 B1 * | 10/2002 | Emrick .................... | A47H 1/14 248/544 |
| 6,484,979 B1 * | 11/2002 | Medlin, Jr. ............. | H02G 3/125 248/205.1 |
| 7,572,073 B2 | 8/2009 | Kenoyer et al. | |
| 7,665,698 B2 | 2/2010 | Desorbo et al. | |
| 7,684,694 B2 | 3/2010 | Fromm | |
| 8,215,597 B1 * | 7/2012 | Medlin, Sr. .......... | H05K 5/0204 248/200.1 |
| 8,393,584 B2 | 3/2013 | Burns | |
| 8,763,965 B1 * | 7/2014 | Peay ..................... | A47L 15/427 248/205.1 |
| 2004/0211868 A1 | 10/2004 | Holmes et al. | |
| 2010/0301188 A1 | 12/2010 | Schimelfenyg | |

* cited by examiner

*Primary Examiner* — Todd M Epps
(74) *Attorney, Agent, or Firm* — Richard L. Marsh

(57) ABSTRACT

A foldable extension arm for holding a camera, cellular phone, a recorder or the like has several foldable segments and a terminal mounting plate. The foldable segments have an edge portion joined to a main body with a longitudinal living hinge. The main bodies and the edge portions are joined together at the ends with a transverse living hinge. The foldable segments can be unfolded and retained in an extended configuration by folding the edge portion toward the main body. The mounting plate is joined to the last one of foldable segments with a living hinge and has a locking slot to receive a locking tab hinged on the last foldable segment so the mounting plate may be set at an angle from about 15 degrees to about 95 degrees with respect to the foldable extension arm.

20 Claims, 9 Drawing Sheets

MULTI-FUNCTION FOLDABLE SUPPORT ARM

BACKGROUND OF THE INVENTION

1. Field of the Invention

This invention relates to a support arm for a camera, cellular phone, recording device or the like to extend the selected device a distance from the body of the holder. The support arm may be folded into a compact configuration for storage in a pocket or the like. The arm is held rigid by inwardly folding at least one edge along a longitudinal living hinge between the edge and the main body of the plurality of jointed segments of the arm. The arm may alternately be provided with a rotatable mounting pad on a terminal segment and the terminal segment may be provided with a nano-suction cups an adhesive pad and/or a stretchable strap to retain the recording device on the arm.

2. Prior Art Statement

It is known that when shooting videos with smart phone camera, the smart phone will rotate the image/video automatically depending upon how you hold your smart phone. However when transferring smart phone videos to your Windows PC, you may find the Windows Media Center or Media Player cannot play some of them correctly. Some smart phone videos are sideways and some are upside down when playing on PC. The smart phone video upside down or sideway problem occurs when you play the recorded video on a third-party software though. You won't be aware of it playing the smart phone videos on its own smart phone. Thus, there is a great need for a recording device extension arm that has a rotatable mounting plate unlocked and a terminal plate that has the ability to go from −90 degree to 180 degree (total 270 degrees radial travel) on a loose living hinge and the ability of the rotatable mounting plate together with the gravity from the weight of the smart phone wherein the smart phone will always keep its position related to the video as it does not matter which direction the smart phone is moved around using the multifunction foldable support arm of the instant invention.

It is known to provide a cardboard edge/corner protection device has a plurality of longitudinal creases on one side of a sheet of cardboard cut to a precise width. The creases allow the cardboard to be formed into a particular configuration for protection of edges or corners of merchandise. For instance, see the U.S. Pat. No. 5,914,171 issued on Jun. 22, 1999 to Timothy Corbon Morley. No transverse crease nor crease on the opposed side of the sheet is provided and thus the cardboard edge/corner protective device cannot be accordion folded for storage, unfolded and held in an extended configuration by folding the edges along longitudinal living hinges inwardly, outwardly or both. Thus, there is a great need for a foldable extension arm with several foldable segments and a mounting plate. The foldable segments have an edge portion joined to a main body with a longitudinal living hinge. The main bodies and the edge portions are joined together at the ends with a transverse living hinge. The foldable segments can be unfolded and retained in an extended configuration by angularly disposing the edge portion with respect to the main body.

Also known is a telescoping pole used for a remote mount for a camera is attached to a footed base for positioning the base in a straight line and at a distance from the operator. The telescoping pole must be extended by pulling on the end thereof and the footed base holding the camera must rest on an object. For instance, see the U.S. Pat. No. 7,684,694 B2 issued on Mar. 23, 2010 to Wayne G. Fromm. Since the footed base must rest on an object, the device cannot be extended in free space to take a picture with a camera, cellular phone or record with a recorder. Therefore, there is still a great need for a foldable extension arm with several foldable segments and a mounting plate. The foldable segments have an edge portion joined to a main body with a longitudinal living hinge. The main bodies and the edge portions are joined together at the ends with a transverse living hinge. The foldable segments can be unfolded and retained in an extended configuration by angularly disposing the edge portion with respect to the main body.

Further known is a plurality of telescoping sections collapsible into a grip. A terminal section is adapted to receive a camera mounting screw to attach to the provided screw hole in most cameras. The purpose of the device is to take pictures of oneself commonly called "selfies" using a remote switch on the grip. The telescoping sections have mating "V" grooves to prevent rotation of the device. A convex mirror is provided to show background and placement of oneself for proper framing with the background. For instance, see the U.S. Pat. No. 4,530,580 issued on Jul. 23, 1985 to Ueda, et al. Though the device holds a camera for remote photographing of oneself, great rotational control is required to keep the camera pointed correctly even though the telescoping arms have mating "V" grooves to assist with prevention of rotation. Manufacturing tolerances with such mating "V" grooves still results in unwanted rotational inaccuracies. Accordingly there is a great need for a foldable extension arm with several foldable segments and a mounting plate. The foldable segments have an edge portion joined to a main body with a longitudinal living hinge. The main bodies and the edge portions are joined together at the ends with a transverse living hinge. The foldable segments can be unfolded and retained in an rigid extended configuration by angularly disposing the edge portion with respect to the main body. The mounting plate may be set at an angle with respect to the foldable extension arm.

It is known to provide a pair of segments joined together with a locking hinge. A third segment is joined to one of the pair of segments with a free hinge. The third segment is provided with a mounting screw for attaching a camera or the like thereto. For instance, see the U.S. Pat. No. 7,572,073 B2 issued on Aug. 11, 2009 to Kenoyer, et al. The segments need to be tightened together to make the stand functional and the multiple parts required make the device costly and subject to loss of parts. Therefore, there exists a great need for a multi-function single piece extension arm that can be folded flat for ease of storage and transport. The great need also still exists for an easy to use multi-function extension arm of foldable segments that is retained in an rigid extended configuration by angularly disposing one edge portion with respect to the main body.

It is also known to provide a support boss arranged for selective engagement to an available support post. The support boss includes an articulated linkage arm system, including first and second levers secured to the support boss with the second lever secured to a first rotative member and the first rotative member secured to a second rotative member that in turn is secured to a third rotative member spaced from the second rotative member, the third rotative member having a support plate for supporting a camera. For instance, see the U.S. Pat. No. 5,497,214 issued on Mar. 5, 1996 to Michael A. Labree. It is readily apparent that use of the device without a rigid support post would defeat the purpose of this device and therefore it is not useful as a personal support. The multiple segments must be aligned exactly so the need for a simple device comprising several flat segments that can be unfolded and extended into a straight, rigid form for mounting a camera, cellular phone or recorder still exists. Additionally, the need for a simple extension arm made integrally is greatly needed, these needs achieved by the instant invention.

It is also known to provide a plurality of mating arcuate segments strung on a cable. One end of the cable is fixed to the camera mount while the other end is fixed to a cam for providing a tension in the cable locking the arcuate segments into the chosen configuration. The arcuate segments preferably have mating grooves and lands which may be selectively positioned to change the configuration of the configurable arm comprised of the plurality of mating segments. The arm is attached to a shoulder clamp adapted to be fitted over the shoulder of the operator. For instance, see the U.S. Pat. No. 7,665,698 B2 issued Feb. 23, 2010 to Desboro, et al. Though used as a personal device mount, the multiple separate pieces, cam controlled biasing force and shoulder mount greatly increases the cost and complexity of the device. Accordingly, there is a tremendous need for a low cost, single or two piece personal extension arm mount that can be unfolded and held in a rigid configuration by one hand to photograph, video and/or record events with a personal extension arm which is accomplished by the instant invention.

It is also known to provide a flexible tube with one end attached to a base or clamp and the other end to a mounting plate for holding an E-book, webcam or the like. Hook and loop fastener strips are provided to attach the E-book to the mounting plate. The device may be set upon a floor, clamped to the edge of a desk or affixed with a suction cup. For instance, see the U. S. Patent Applications 2004/0211868 A1 published on Oct. 28, 2004 by Holmes, et al. and 2010/0301188 A1 published on Dec. 2, 2010 by Erik Schmielfenyg or the U.S. Pat. No. 8,393,584 B2 issued Mar. 12, 2013 to Salih Maurice Burns. Though much simpler in construction than Desboro, et al., or Labree, hand holding of these devices for positioning a personal device for photos, videos or recording requires great skill to maintain the device steady. Consequently, there still exists a great need for a simple, foldable personal extension arm that can be unfolded and held by one hand in a rigid configuration by folding at least one edge portion about a longitudinal living hinge inwardly toward a body portion, that need fully satisfied by the instant invention to be described below.

It is also known to provide a top plate having a camera mount is slidable relative to a bottom plate. The top plate has a camera or the like attached with a screw. The top plate may be locked into any position along the length of the bottom plate. For instance, see the U.S. Pat. No. 5,429,332 issued on Jul. 4, 1995 to Masao Ishikawa. It is quite apparent that the cost of making such a device of sufficient length while providing a easily portable and storable compact device would be considerable. It is also readily apparent that the need for a compact, foldable mounting extension arm for mounting a camera, cellular phone or recorder for photos, videos or recordings has not been satisfied with any prior art device and begs to be accomplished. The instant invention provides a simple, compact, foldable extension arm that overcomes the multiple component and metallic limitations of all prior art devices.

Finally, it is known to produce folding step stools comprising a plurality of segments joined together with cooperating knuckle parts joined together with hinge pins. For instance, see U. S. Design Pat. No. D 460,566 issued on 16 Jul. 2002 to Henschel, et al. The stool may be folded into a flat configuration by lifting the center of the top plate and folding inwardly the end plates. Though the stool may be folded into a compact shape, it cannot be extended into an elongated configuration as taught by the instant invention using living hinges. Accordingly, the need for a simple compact, foldable extension arm for use with recording devices still exists.

SUMMARY OF THE INVENTION

The principal object of this invention is to produce an arm extension for smart phones, cameras and recorders that is inexpensive, pocket-size when closed, quick to operate (unfold/fold, nano-suction-cup holding) and can be used for a variety of uses.

One object of this invention is to provide a foldable extension arm with several foldable segments and a mounting plate. The foldable segments have an edge portion joined to a main body with a longitudinal living hinge. The main bodies and the edge portions are joined together at the ends with transverse living hinges. The foldable segments can be unfolded and retained in an extended configuration by angularly disposing the edge portion with respect to the main body. The mounting plate is joined to the last one of foldable segments with a transverse living hinge and has a locking slot to receive a locking tab hinged on the last foldable segment so the mounting plate may be set at an angle from about 0 degrees to about 90 degrees with respect to the foldable extension arm.

Another object of this invention is to provide a foldable extension arm with several foldable segments and a mounting plate with the foldable segments joined by transverse living hinges disposed into the opposite faces between the segments so the extension arm may be accordion folded for compact storage and/or transport.

A primary goal of this invention is to provide a foldable extension arm of several foldable segments and a mounting plate where the edge portion of each segment is joined by a longitudinal living hinge so when the edge portion is inwardly or outwardly folded upon unfolding the foldable segments the extension arm becomes rigid.

A significant feature of this invention is to provide a foldable extension arm of several foldable segments and a mounting plate where the mounting plate is provided with a holding mechanism selected from nano-suction cups, adhesive pads and elastic straps.

A main purpose of this invention is to provide a foldable extension arm of several foldable segments and a mounting plate where the mounting plate is further provided with a strap hook to retain an end of an elastic strap.

A primary principle of this invention is to provide a foldable extension arm of several foldable segments, a terminal plate and a rotatable mounting plate where the foldable segments have an edge portion joined to a main body with a longitudinal living hinge and the segments and edge portions are joined together at mating ends with a transverse living hinge. The foldable segments are to be unfolded and retained in an extended configuration by angularly disposing an edge portion with respect to the main body while the rotatable mounting plate is made to rotate upon the terminal plate. A locking tab on last foldable segments frictionally fits within a locking tab slot on the terminal plate to lock the terminal plate at an angle from about 0 degrees to about 95 degrees with respect to said front face of said foldable extension arm.

A principal aim of this invention is to provide a foldable extension arm of several foldable segments with depressions into the face(s) to receive magnets to mount the arm to metal objects or to itself between thin layers of material where magnets still are operable.

A primary aspect of this invention is to provide a foldable extension arm of several foldable segments, a terminal plate and a rotatable mounting plate where the mounting plate has at least one keyhole at one end, a hook at the opposite end and where an elastic strap has a retainment end to be retained in the keyhole.

DESCRIPTION OF THE PREFERRED EMBODIMENTS

Figure 1:
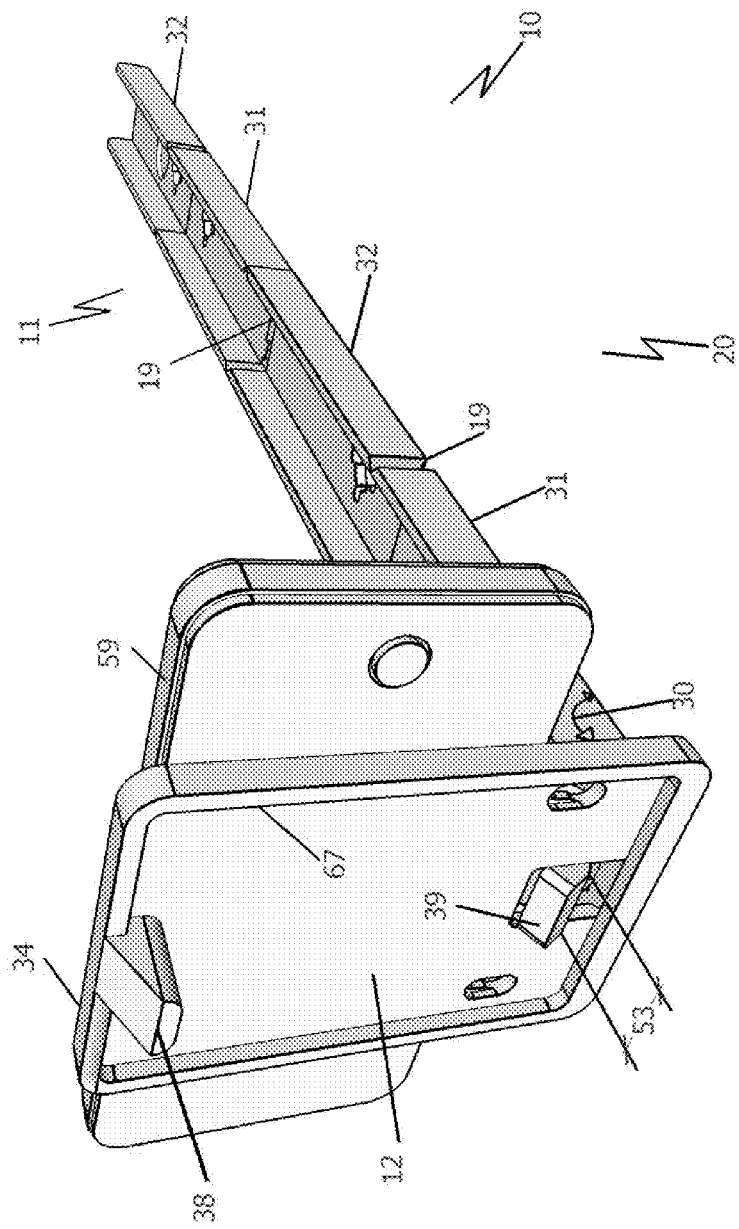
FIG. 1 is an end perspective view of a first embodiment of the foldable extension arm of this invention in a deployed mode showing a recording device removably affixed to a terminal plate with nano-suction cups or an adhesive pad.
Figure 2:
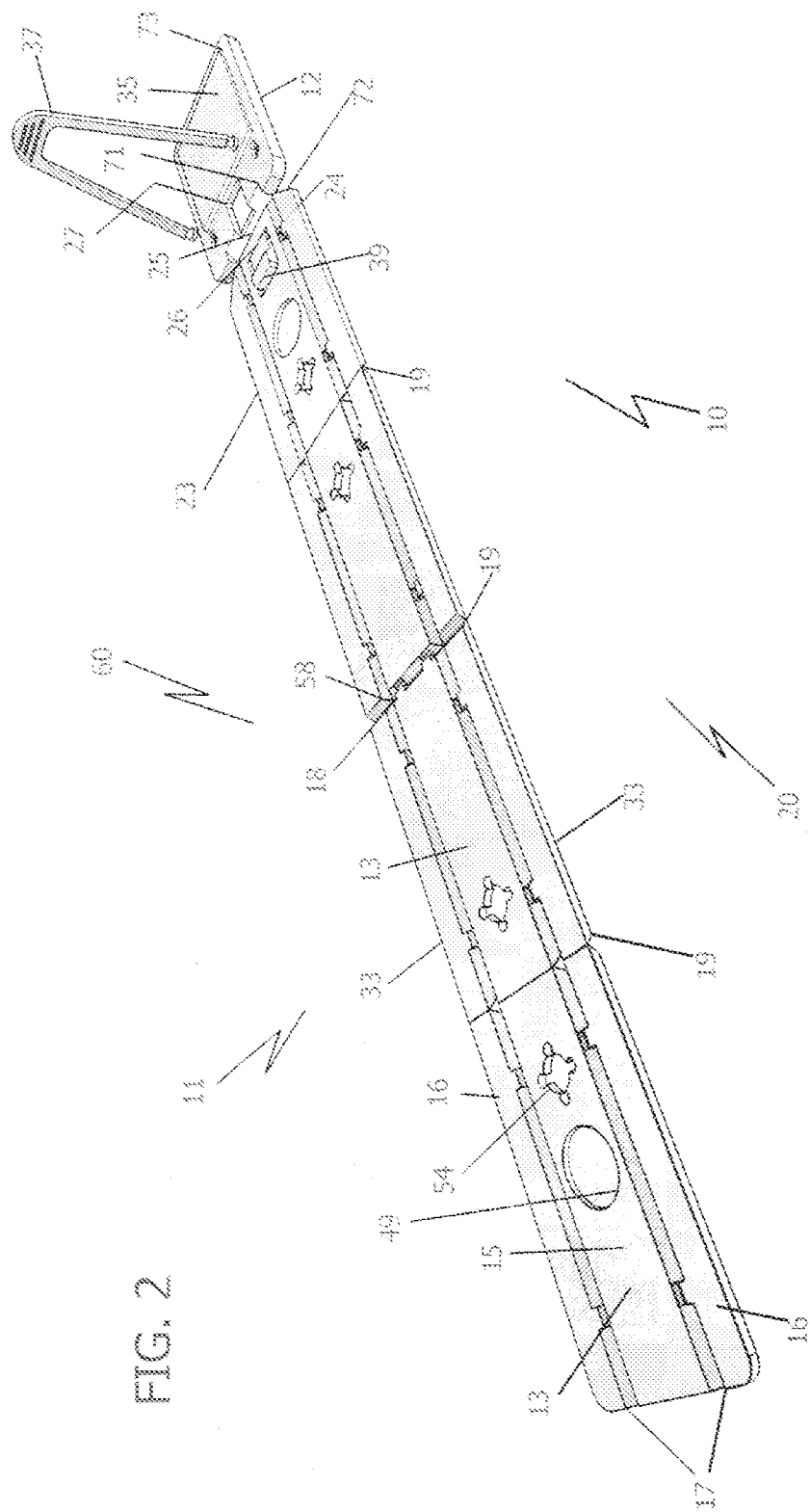
FIG. 2 is a perspective view of the first embodiment of the foldable extension arm of this invention in a non-deployed flat mode showing an elastic strap for removably securing a device a terminal plate.
Figure 3:
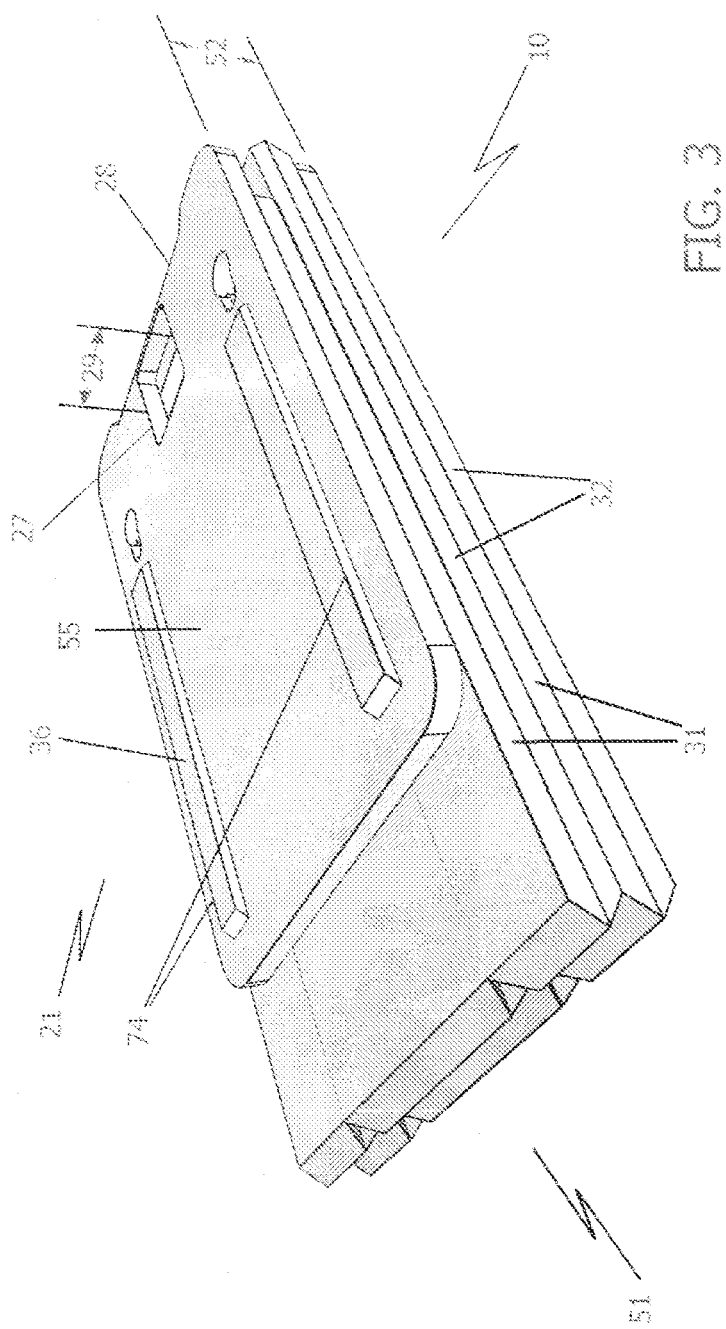
FIG. 3 is an enlarged perspective view of the first embodiment of the foldable extension arm in a folded storage or transport posture.
Figure 4:
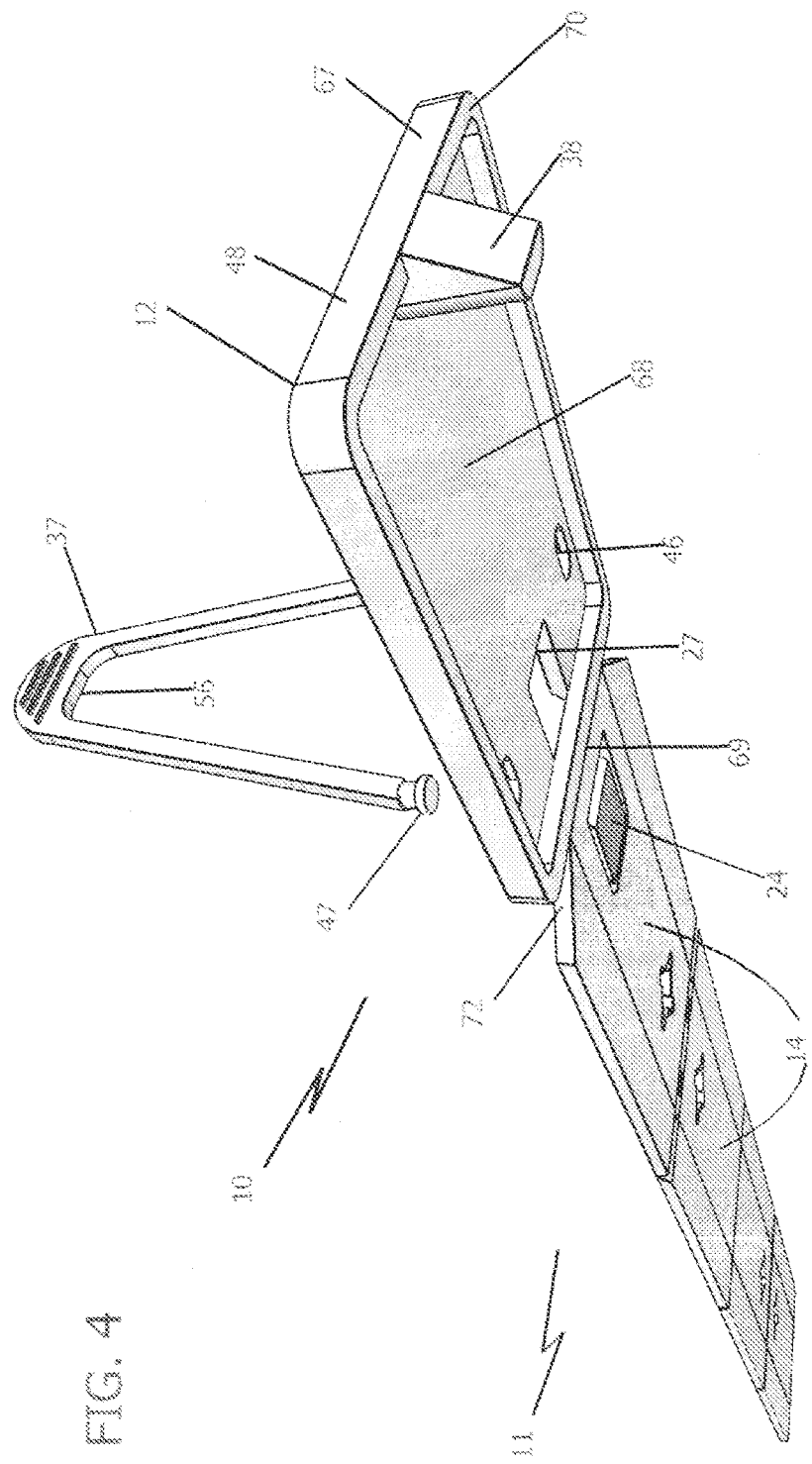
FIG. 4 is an enlarged view of the rear face of the first embodiment of the foldable extension arm showing a transverse living hinge disposed thereinto and a strap hook at a retainment end of the terminal plate.
Figure 7:
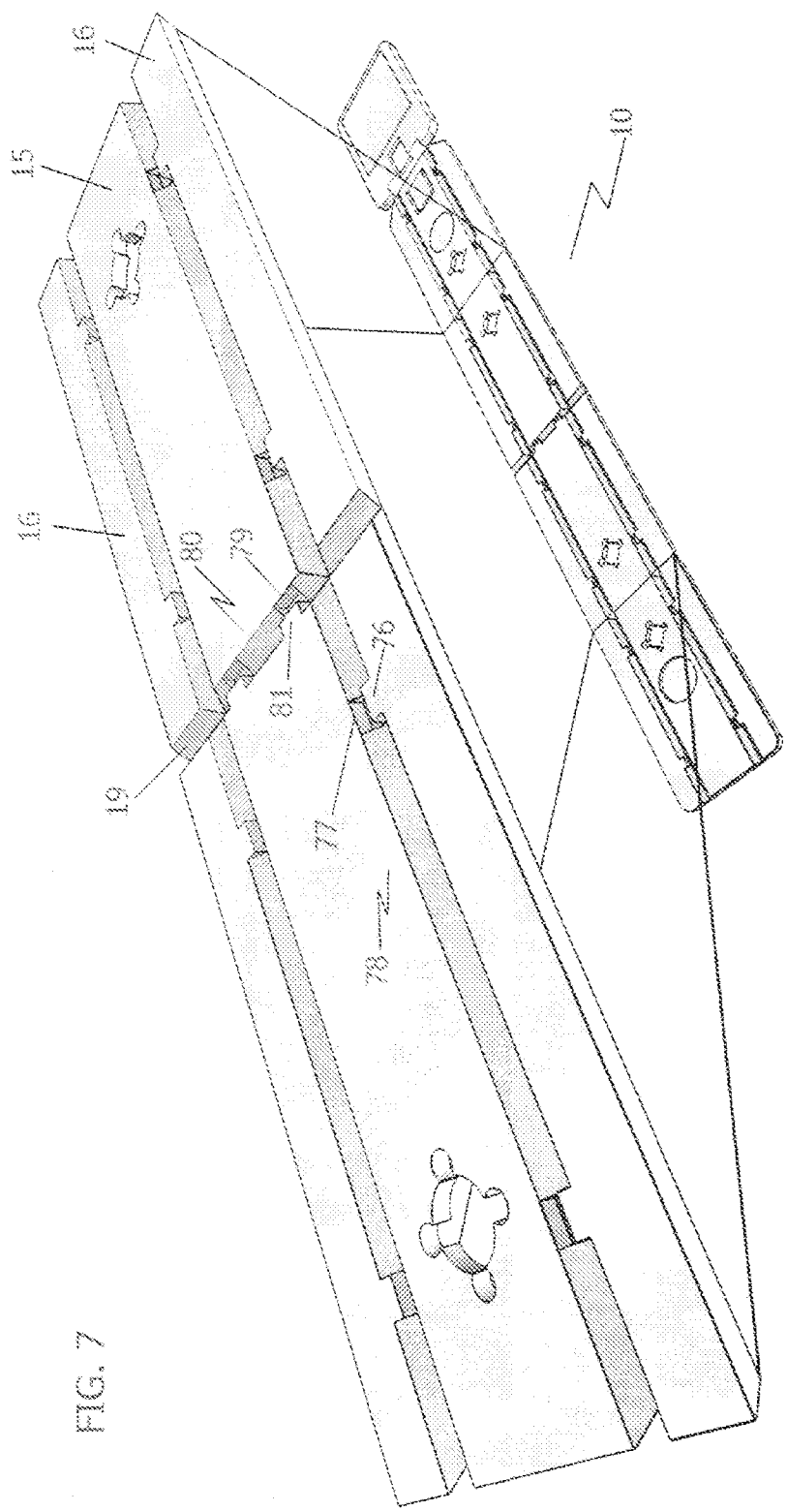
FIG. 7 is a greatly enlarged view of edge portion and living hinge locking tabs of the foldable extension arms of this invention.
Figure 8:
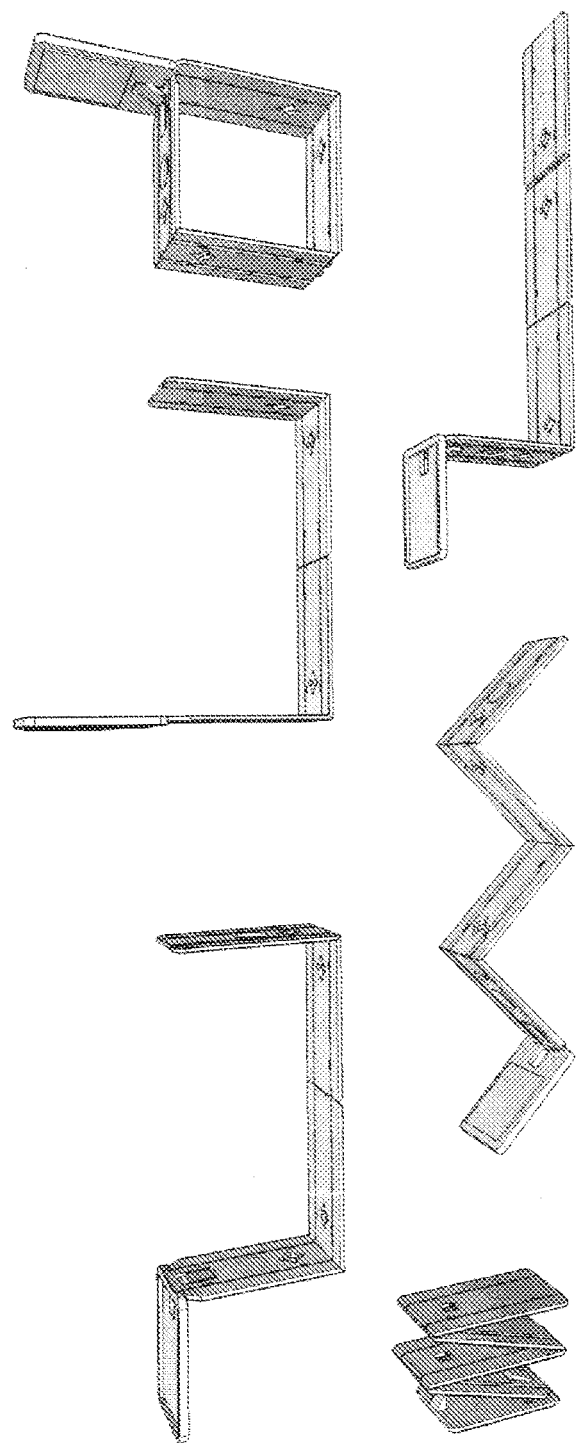
FIG. 8 is a depiction of multiple configurations for deployment of the foldable extension arm of this invention.
Figure 9:
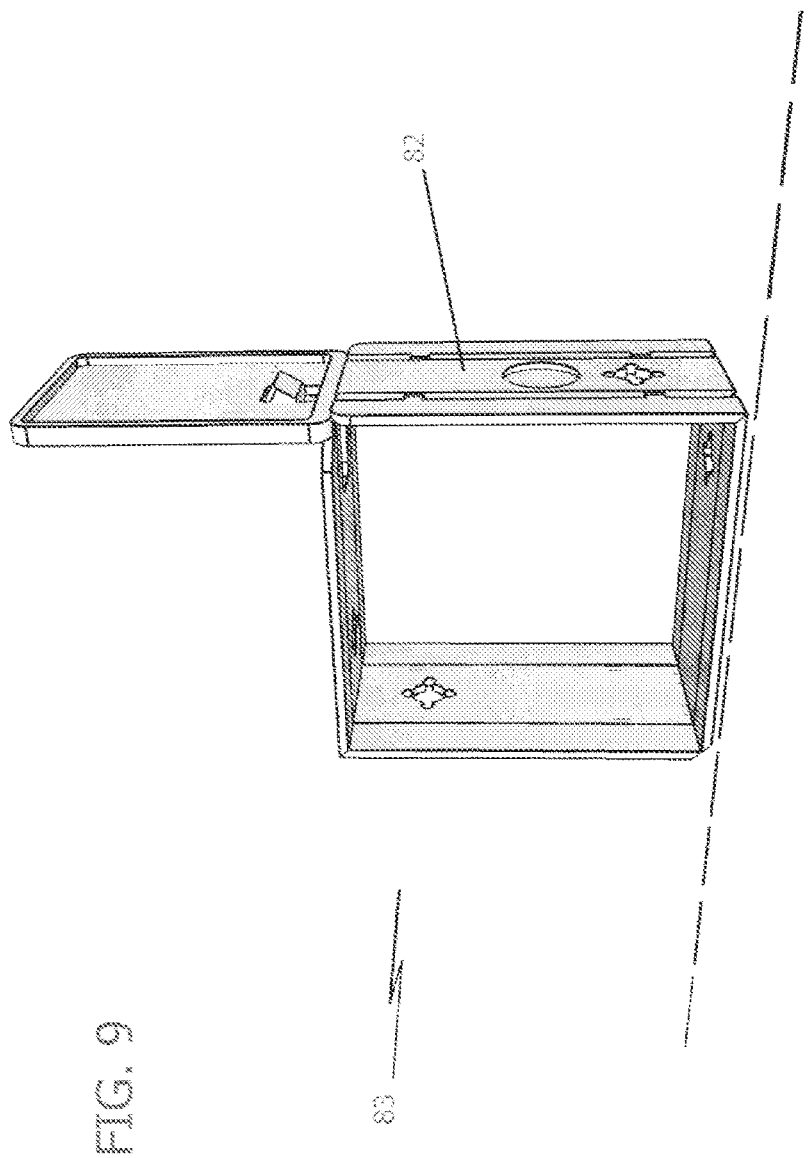
FIG. 9 shows the foldable extension arm of this invention formed into a rigid box for placement upon a flat surface.

Referring now to FIG. 1, the first embodiment of the multi-function foldable extension arm of this invention for remote holding of recording devices 59 such as smart phones, cameras, audio recorders and/or video recorders is generally shown by the number 10. Foldable extension arm 10 is inexpensive, pocket-size when closed and quick to use by unfolding and attaching recording device 59 with nano-suction cups 35, adhesive pad 36 and/or an elastic securing strap 37 to be fully described hereinafter. In addition, extension arm 10 may be used for a variety of other uses such as displaying a note, advertisement, directional sign or the like. Referring in addition to FIGS. 2-4, foldable extension arm 10 comprises a plurality of foldable segments 11 and a terminal plate 12, each of foldable segments 11 provided with a front face 13 and a rear face 14. Foldable segments 11 further comprise a main body 15 and at least one edge portion 16, wherein edge portion 16 of each foldable segment 11 is joined to main body 15 with a longitudinal living hinge 17. Foldable segments 11 including main body 15 and edge portions 16 are joined together at mating ends 18, 58 thereof with transverse living hinges 19 wherein foldable segments 11 are adapted to be unfolded and retained in an extended configuration 20 by angularly disposing at least one edge portion 16 with respect to main body 15 as shown in FIG. 1. Referring also to FIG. 7, edge portions 16 are preferably locked into right angle relationship with main body 15 by male locking features 76 which are frictionally received into female locking features 77 as male locking features 76 are slightly wider than female locking features 77. Male locking features 76 and female locking features 77 are arranged in pairs 78 on each segment 31, 32, each segment 31, 32 provided with four pairs 78. Preferably, one pair 78 is disposed proximate each mating end 18, 58 between each edge portion 16 and main portion 15. Though it is preferred that pairs 78 be so arranged, it is fully within the scope of this invention to use only one pair 78 on each edge portion 16 with main portion 15 or to make multi-function foldable extension arm 10 without pairs 78. Where pairs 78 of male locking features 76 and female locking features 77 are provided, it is readily apparent that upon deployment of multi-function foldable extension arm 10 additional rigidity is provided and thus multi-function foldable extension arm 10 need not be gripped tightly in order to retain same in extended configuration 20. Still referring to FIG. 7, it is also preferred that main bodies 15 be locked together at transverse living hinges 19 by providing locking features 80 comprising male locking features 79 and female locking features 81. Each male locking feature 79 extends beyond living hinge 19 and is received into female locking feature 81 when main bodies 15 of multi-function foldable extension arm 10 are formed into other configurations as shown in FIG. 8. Male locking features 79 are slightly wider in width than female locking features 81 and thus additional rigidity is provided to multi-function foldable extension arm 10 in FIG. 8 configurations. Female locking features 81 may alternately be disposed fully through main bodies 15 adjacent transverse living hinges 19 and male locking features 79 extended beyond living hinges 19 to provide for greater rigidity to multi-function foldable extension arm 10 in extended configuration 20 and such that male locking feature 79 may pass through main body 15 when multi-function foldable extension arm 10 is formed into other configurations as shown in FIG. 8. Other configurations shown in FIG. 8 may be formed by standing multi-function foldable extension arm 10 on side edge 33 of one edge portion 16 in zigzag, square, U, L, J, V and may then be used for placing recording device 59 in a fixed location. Likewise, multi-function foldable extension arm 10 may be formed into a rigid box 82 wherein multi-function foldable extension arm 10 may be placed in an upright position 83 on one segment 31 or 32 as shown in FIG. 9.

In FIGS. 1-4, terminal plate 12 functions as a mounting surface 21 for recording devices 59 and is joined to a terminal end 25 of main body 15 of last one 23 of foldable segments 11 at joining end 28 thereof with a transverse living hinge 69. Terminal plate 12 is preferably provided with a peripheral flange 67 as shown in FIGS. 2 and 4 extending away from rear face 68 thereof to provide for additional strength to terminal plate 12. Peripheral flange 67 of terminal plate 12 carries transverse living hinge 69 at a bottom edge 70 thereof, transverse living hinge 69 affixed to last one 23 of foldable segments 11. As transverse living hinge 69 is affixed to bottom edge 70 of peripheral flange 67 of terminal plate 12, bottom edge 70 lies flat against rear face 14 of last one 23 of foldable segments 11. Last one 23 of foldable segments 11 further is provided with a plate locking tab 24 joined adjacent to terminal end 25 of last one 23 of foldable segments 11 with a separate transverse living hinge 26 and terminal plate 12 is provided with a locking tab slot 27 disposed into joining end 28 thereof. Locking tab slot 27 is narrower in width 29 than a width 53 of plate locking tab 24 wherein terminal plate 12 is removably locked to last one 23 of foldable segments 11 at an angle 30 from about 15 degrees to about 95 degrees with respect to front face 13 of foldable extension arm 10 upon extending foldable extension arm 10 into extended configuration 20.

Front face 13 of terminal plate 12 has locking notches 71 disposed thereinto at joining end 28 thereof, locking notches 71 aligned with ends 72 of edge portions 16 of last one 23 of foldable segments 11 when edge portions 16 are folded inwardly toward front face 13. Notches 71 thus capture ends 72 thereinto when edge portions 16 are fully folded inwardly to a 90 degree angle with respect to front face 13 and terminal plate 12 is folded inwardly at least 90 degrees toward front face 13 of last one 23 of foldable segments 11. Ends 72 captured into notches 71 effectively lock foldable segments 11 into rigid configuration as shown in FIG. 1. As rear face 68 of terminal plate 12 is recessed under peripheral flange 67 of terminal plate 12 and transverse living hinge 69 is at bottom edge 70 of peripheral flange 67, bottom edge 70 lies on rear face 14 of last one 23 of foldable segments 11. Thus, enlarged retainment ends 47 of elastic securing strap 37 do not interfere with folding of foldable segments 11 into accordion folded 51 collapsed height state 52. Bottom edge 70 of peripheral flange 67 carries a strap hook 38 depending therefrom, strap hook 38 received in multi-function holes 54 in main body 15 of foldable segments 11, the function of both strap hook 38 and multi-function holes 54 to be fully explained hereinafter.

Numbering foldable segments 11 beginning at terminal plate 12, transverse living hinge 19 between each odd numbered foldable segment 31 and each even numbered foldable segment 32 is disposed into rear face 14 while transverse living hinge 19 between each even numbered foldable segment 32 and each odd numbered foldable segment 31 is disposed into front face 13 thereof thus making foldable extension arm 10 capable of being accordion folded 51 for ease of storage and transport as shown in FIG. 3. As foldable segments 11 of foldable extension arm 10 are preferably from about one sixteenth of an inch to about one quarter of an inch thick and most preferably about one eighth inch thick, the collapsed stack height 52 of four foldable segments 11 and terminal plate 12 of this first embodiment is only about three quarters of an inch and even with a smart phone attached to terminal plate 12, collapsed stack height 52 is about one inch thus readily fitting in a shirt or pants pocket or purse. Foldable segments 11 may be formed from wood, metal, natural rubber or a polymeric material selected from the group consisting of epoxy, acrylic, vinyl ester, methyl methacrylate, isophthalic polyester, terephthalic polyester, orthophthalic polyester, dicyclopentadiene and polyurethane, acetals, vinyls, tetrafluoroethylenes, propylenes, ethylenes, styrenes, amides, amide-imides, parabenzamides, vinylchlorides, carbonates, ABS, acrylates, or combinations thereof but most foldable segments 11 and terminal plate 12 are preferably formed from polycarbonate. Since foldable extension arm 10 is an integral unit divided into foldable segments 11 and terminal plate 12 by transverse living hinges 19, 69, foldable extension arm 10 may be cut from strips of an elongated polymeric plate material 60 from about two to about four inches in width with transverse and longitudinal living hinges 17, 19, 69 formed by machining grooves in front face 13 and rear face 14 in appropriate locations. Alternately, foldable extension arm 10 may be molded from an elastomeric material. Since multi-function foldable extension arm 10 is preferably formed from polymeric material, it is water proof, sand proof, rust proof and thus it is readily cleaned with water and household cleaning agents if necessary. Though the figures depict foldable extension arm 10 with four foldable segments 11 and one terminal plate 12, it is fully within the scope of this invention to provide for a greater number of foldable segments 11 to further extend the reach of foldable extension arm 10. It is obvious then that it is also within the scope of this invention to provide for an odd number of foldable segments 11.

In the first embodiment of the foldable extension arm 10 shown in FIGS. 1-4, foldable segments 11 are provided with edge portions 16 on opposed side edges 33 thereof, both edge portions 16 formed with longitudinal living hinges 17 disposed into front face 13 and when deployed, both edge portions 16 are folded inwardly toward front face 13. Though it is preferred to fold edge portions 16 inwardly toward front face 13 over longitudinal living hinges 17, it is possible to fold edge portion 16 outwardly toward rear face 14 upon unfolding foldable segments 11. Furthermore, it is possible to fold one edge portion 16 inwardly toward front face 13 and one edge portion 16 outwardly toward rear face 14. Additionally, it is fully within the scope of this invention to provide only one longitudinal living hinge 17 on one side edge 33 only thus producing foldable extension arm 10 with only one edge portion 16. Thus, with only one edge portion 16 on foldable extension arm 10, when deployed only one edge portion 16 would be folded inwardly toward front face 13 upon unfolding foldable segments 11. In an embodiment with only one edge portion 16, either the right or left edge portion 16 may be produced. It should also be readily apparent that longitudinal living hinges 17 may be disposed into rear face 14 of foldable segments 11 such that edge portions 16 may be folded rearwardly toward rear face 14 to produce the rigid elongated effect for foldable extension arm 10.

Mounting surface 21 of terminal plate 12 of foldable extension arm 10 is provided with a holding mechanism 34 selected from the group comprising nano-suction cups 35 generally shown on mounting surface 21 in FIG. 2, adhesive pads 36 shown as strips on FIG. 3 and/or elastic securing strap(s) 37 as shown in FIGS. 2 and 4. Nano-suction cups 35 are emerging technology surfaces that appear to be smooth but have millions of very small depressions into the face of the surface that function like conventional suction cups so the power of so many nano-suction cups actually allows apparent adhesion of an object to a surface but also allows easy removal of the object from the surface. Nano-suction cups 35 of this invention may be a full surface pad 73 as shown in FIG. 2 but may also be strips of material 74 such as shown in FIG. 3 and are very useful in temporarily affixing lighter recording devices 59 to terminal plate 12. Adhesive pads 36 of FIG. 3 are conventional double sided adhesive pads that are adhered to front face 13 of terminal plate 12 and have an adhesive surface 55 facing outwardly for mounting the recording device 59 thereto. Adhesive pads 36 have a more permanent bonding nature and are preferred by users who wish to permanently affix recording device 59 to terminal plate 12. A third method of securing recording device 59 to terminal plate 12 is with the use of an elastic securing strap 37 which is removably affixed to terminal plate 12 by at least one enlarged retainment end 47 disposed into a keyhole 46 disposed through terminal plate 12. Preferably, elastic securing strap 37 is a "V" shaped elastic securing strap with two enlarged retainment ends 47 that is adapted to have a bight 56 therebetween hooked over strap hook 38 depending from an end 48 of bottom edge 70 of peripheral flange 67 opposite joining end 28 of terminal plate 12. Enlarged retainment ends 47 of elastic securing strap 37 are preferably placed in spaced apart keyholes 46 in terminal plate 12 and bight 56 of elastic securing strap 37 is adapted to be pulled over strap hook 38 and retained there thus capturing recording device 59 on terminal plate 12. Elastic securing strap 37 is beneficial in holding heavier recording devices 59 on terminal plate 12 while lighter recording devices 59 may be temporarily retained on terminal plate 12 with nano-suction cups 35. Additionally, elastic securing strap 37 will provide for mounting of various shaped recording devices 59 without the need for a smooth surface for attachment by nano-suction cups 35. Of course, it is within the scope of this invention to use micro-suction cups or larger suction cups in place of nano-suction cups 35.

Foldable extension arm 10 may further have an auxiliary locking portion 39 affixed to a front face of plate locking tab 24 to further extend angle 30 beyond a straight line with foldable segments 11 thus extending angle 30 clockwise from about 340 degrees to about 95 degrees as viewed from a left hand view of foldable extension arm 10 wherein rear face 14 is the vertical axis defining 360 degrees. Main body 15 of foldable segments 11 may be provided with multi-function holes 54 therethrough, multi-function holes 54 adapted to receive protruding elements such as strap hook 38 or auxiliary locking portion 39 thereinto when foldable extension arm 10 is collapsed into accordion folded 51 collapsed height state 52 for storage or transport. Multi-function holes 54 are also used to temporarily mount multi-function foldable extension arm 10 on protruding screws, nails, push pins or the like such that foldable extension arm 10 may be retained on a fixed surface for more than a few moments. Likewise, depressions 49 may be disposed into front face 13 wherein depressions 49 are adapted to receive magnets 50 for removably attaching multi-function foldable extension arm 10 to metallic objects. Thus, as multi-function foldable extension arm 10 has greater reach, is collapsible into a short stack height, provides for ease of mounting recording devices 59 and can be readily deployed into extended configuration 20 by merely unfolding foldable segments 11 and inwardly folding at least one edge portion 16, the limitations of all prior art devices has been overcome.

Figure 5:
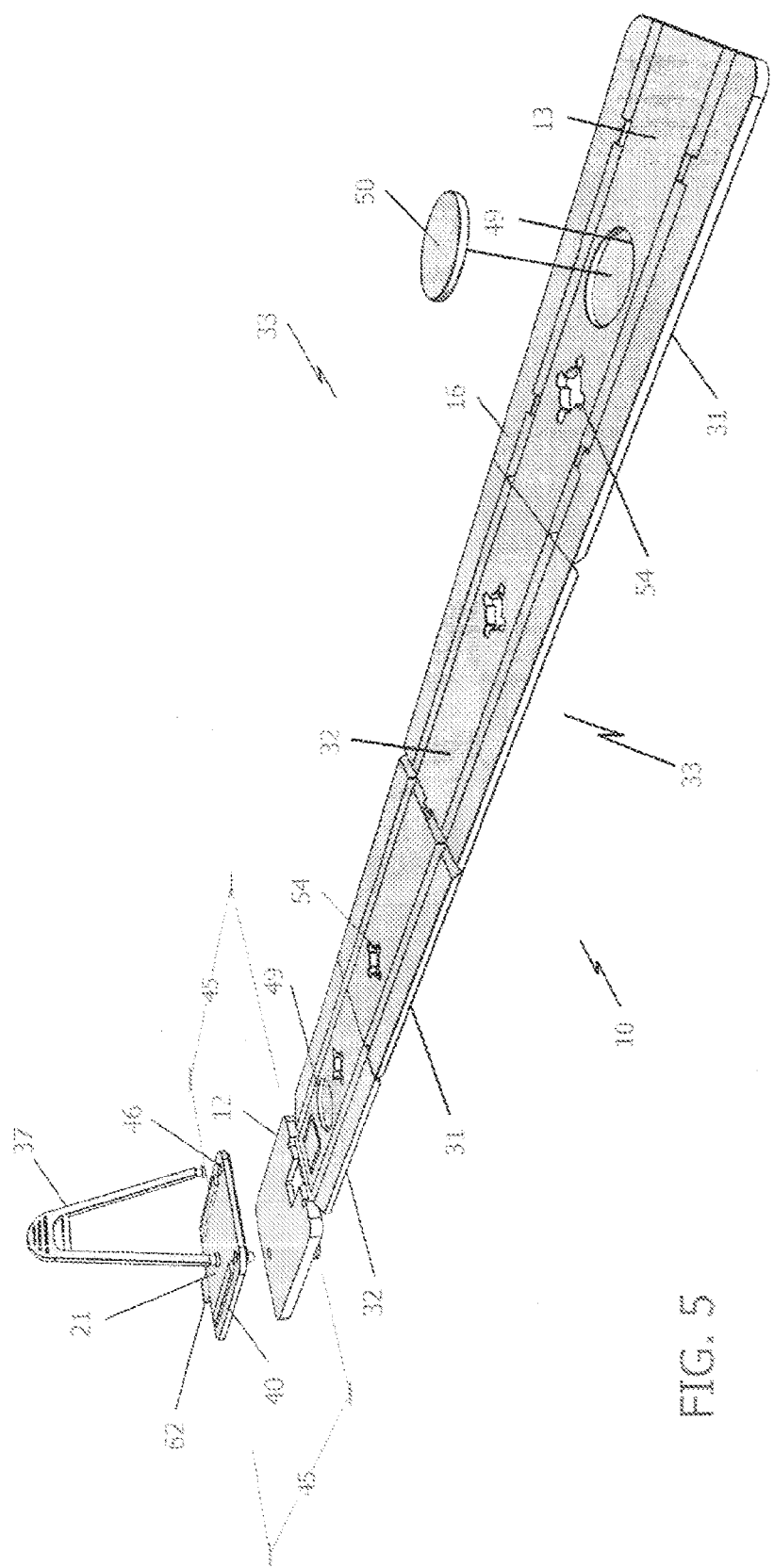
FIG. 5 is a perspective view of a second embodiment of the foldable extension arm of this invention in a non-deployed flat mode showing an elastic strap for removably securing a device to a mounting plate spaced from attachment keyholes of the mounting plate and showing the mounting plate spaced above a terminal plate.
Figure 6:
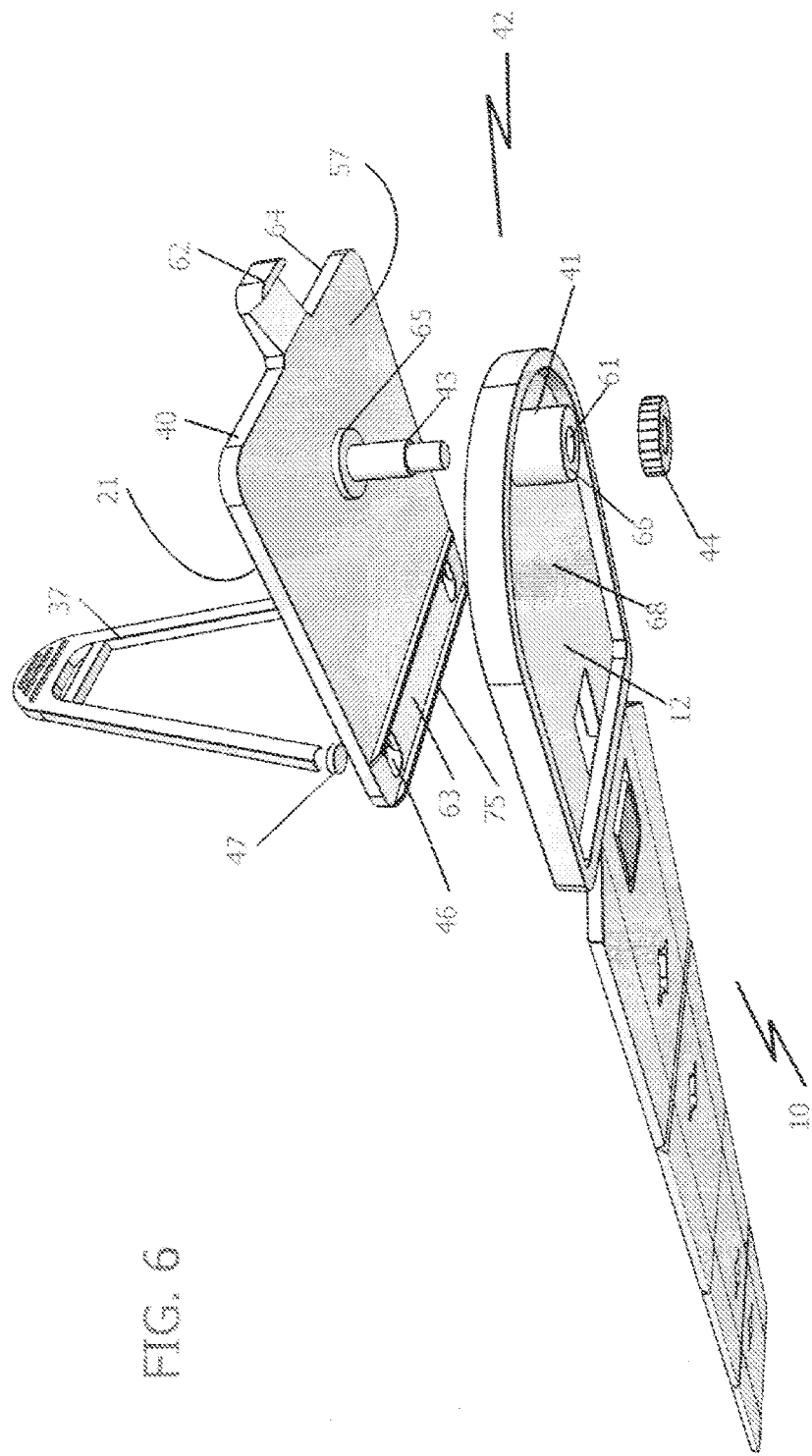
FIG. 6 is an enlarged view of the rear face of the second embodiment of the foldable extension arm showing a transverse living hinge disposed thereinto and a strap hook at a retainment end of the mounting plate and details of rotatably affixing the mounting plate to the terminal plate.

Now jointly considering FIGS. 5-6, a second embodiment of multi-function foldable extension arm 10 is provided with a rotatable mounting plate 40 on terminal plate 12, rotatable mounting plate 40 carrying mounting surface 21 thereupon. As the details of the full description and function of mounting surface 21 has been previously been described and is retained in this second embodiment, further description need not be reiterated here. Furthermore, since the full description of foldable segments 11, main body 15, edge portion 16, longitudinal living hinge 17, transverse living hinge 19 and the functions thereof has also been recited, those details are not repeated here. Terminal plate 12 of this second embodiment is provided with a bearing post 41 depending from rear face 68 thereof, bearing post 41 disposed adjacent an outer end 42 of terminal plate 12. Bearing post 41 receives a stud 43 depending from a bottom surface 57 of rotatable mounting plate 40, stud 43 protruding from stud hole 61 in bearing post 41, stud 43 receiving a nut 44 thereupon to rotatably affix rotatable mounting plate 40 to terminal plate 12. Rotatable mounting plate 40 may be rotated to any angle parallel to a plane 45 of terminal plate 12 and temporarily retained thereat by tightening nut 44 against an outer end 66 of bearing post 41. Stud 43 is depends from bottom surface 57 of rotatable mounting plate 40, stud 43 provided with a washer portion 65 extending beyond bottom surface 57 to ensure rotatable function upon front face 13 of terminal plate 12. Stud 43 may alternately be located in a relief 63 into bottom surface 57 at a first end 75 of rotatable mounting plate 40, relief 63 also providing clearance between enlarged retainment ends 47 of elastic securing strap 37 and front face 13 of terminal plate 12 thus cooperating with washer portion 65 to permit full rotation of rotatable mounting plate 40 upon terminal plate 12. Strap hook 62 protrudes from free end 64 of rotatable mounting plate 40 and receives bight 56 of elastic securing strap 37 thereover upon attachment of recording device 59 upon mounting surface 21 of rotatable mounting plate 40, strap hook 62 thus providing full 360 degree rotation of rotatable mounting plate 40.

Multi-function holes 54 are provided through main body 15 at selected locations and are aligned when foldable segments 11 are accordion folded 51 into collapsed height state 52. One multi-function hole 54 receives bearing post 41 and stud 43 with nut 44 thereupon passing therethrough. The total length of bearing post 41 and nut 44 tightened thereagainst is not more than the total thickness of all foldable segments 11 wherein the total thickness of all foldable segments 11 is less than collapsed height state 52.

The preferred length of foldable segments 11 is from four to seven (4-7) inches though it is fully within the scope of this invention to make shorter or longer foldable segments 11. Terminal plate 12 is preferably about the same length as foldable segments 11 such that when multi-function foldable extension arm 10 is accordion folded 51 into short height collapsed state 52, multi-function foldable extension arm 10 fits neatly into a pocket or purse.

In operation, the user withdraws multi-function arm 10 from a pocket or purse, attaches recording device 59 to mounting surface 21 of either terminal plate 12 or rotatable mounting plate 40 with nano-suction cups 35, adhesive pads 36 and/or elastic straps 37. Upon securely mounting recording device 59, the user sets the recording device to remote operation and unfolds foldable segments 11, locks terminal plate 12 into angle 30 to a desired relationship, folds edge portions 16 toward body portion 15 to hold foldable segments 11 into a rigid form, extends multi-function arm 10 to extended configuration 20, focus recording device 59 at the subject to be recorded and operates recording device 59 remotely. Once fully deployed to extended configuration 20 and focused, the user begins recording still photographs, videos, audio recordings and the like by remote control. Remote control may consist of wired triggers, voice commands, automatic operation or combinations thereof. Upon completion of recording, the user ceases remote operation, relaxes a grip upon edge portions 16 until foldable segments 11 can be folded along transverse living hinges 19, 69, folds foldable segments 11 into short height collapsed state 52, removes recording device 59 from mounting surface 21 and stows multi-function arm 10 for future use.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A foldable extension arm comprises a plurality of foldable segments and a terminal plate, said foldable segments provided with a front face and a rear face, said foldable segments further comprising a main body and at least one edge portion, said at least one edge portion of each said foldable segment joined to said main body of each foldable segment with a longitudinal living hinge, said foldable segments and said edge portions joined together at mating ends thereof with a transverse living hinge, said foldable segments adapted to be unfolded and retained in an extended configuration by angularly disposing said at least one edge portion with respect to said main body, said terminal plate joined to a last one of said foldable segments with a transverse living hinge, said last one of said foldable segments further provided with a locking tab joined to a terminal end of said last one of said foldable segments with a separate transverse living hinge, said terminal plate is a mounting plate and is provided with a locking tab slot disposed into a joining end thereof, said locking tab slot narrower in width than said locking tab wherein said terminal end is locked to said last one of said foldable segments at an angle from 15 degrees to 95 degrees with respect to said front face of said foldable extension arm.

2. The foldable extension arm as set forth in claim 1 wherein said transverse living hinge between each said odd numbered foldable segment and each said even numbered foldable segment is disposed into said rear faces thereof.

3. The foldable extension arm as set forth in claim 2 wherein said transverse living hinge between each said even numbered foldable segment and each said odd numbered foldable segment is disposed into said front faces thereof.

4. The foldable extension arm as set forth in claim 1 wherein said edge portion is inwardly folded toward said front face upon unfolding said foldable segments.

5. The foldable extension arm as set forth in claim 1 wherein said edge portion is outwardly folded toward said rear face upon unfolding said foldable segments.

6. The foldable extension arm as set forth in claim 1 wherein said foldable segments are provided with said edge portions on opposed side edges thereof.

7. The foldable extension arm as set forth in claim 1 wherein said mounting plate is provided with a holding mechanism selected from the group comprising nano-suction cups, adhesive pads and elastic securing straps.

8. The foldable extension arm as set forth in claim 7 wherein said mounting plate is further provided with a strap hook.

9. The foldable extension arm as set forth in claim 8 wherein said locking tab is provided with an auxiliary locking portion affixed to a front face thereof.

10. A foldable extension arm comprises a plurality of foldable segments, a terminal plate and a rotatable mounting plate, said foldable segments provided with a front face and a rear face, said foldable segments further comprising a main body and at least one edge portion, said at least one edge portion of each said foldable segment joined to said main body of each foldable segment with a longitudinal living hinge, said foldable segments and said edge portions joined together at mating ends thereof with a transverse living hinge, said foldable segments adapted to be unfolded and retained in an extended configuration by angularly disposing said at least one edge portion with respect to said main body, said terminal plate joined to a last one of said foldable segments with a transverse living hinge, said terminal plate provided with a bearing post affixed to a rear face thereof adjacent an outer end thereof, said bearing post receiving a stud of said rotatable mounting plate therein, said last one of said foldable segments further provided with a locking tab joined to a terminal end of said last one of said foldable segments with a separate transverse living hinge, said terminal plate provided with a locking tab slot disposed into a joining end thereof, said locking tab slot narrower in width than said locking tab wherein said terminal end is locked to said last one of said foldable segments at an angle from 0 degrees to 95 degrees with respect to said front face of said foldable extension arm.

11. The foldable extension arm of claim 10 wherein said rotatable mounting plate is adapted to be disposed at any angle parallel to a plane of said terminal plate.

12. The foldable extension arm of claim 11 wherein said mounting plate is provided with a holding mechanism selected from the group comprising nano-suction cups, adhesive pads and elastic securing straps.

13. The foldable extension arm of claim 12 wherein said mounting plate is provided with at least one keyhole adjacent one end thereof.

14. The foldable extension arm of claim 13 wherein said elastic securing strap is provided with a retainment end thereof adapted to be retained in said keyhole.

15. The foldable extension arm of claim 14 wherein said mounting plate is further provided with a strap hook.

16. The foldable extension arm of claim 15 wherein said elastic securing strap is provided with a hook at an end opposite said retainment end.

17. The foldable extension arm of claim 10 wherein depressions are disposed into a front face side of the main body.

18. The foldable extension arm of claim 11 wherein magnets are fixedly disposed in said depressions for mounting said foldable extension arm to metal objects.

19. A foldable extension arm comprises an elongated plate of material, said elongated plate of material divided into a plurality of segments and a mounting plate, said segments joined together with transverse living hinges, said mounting plate joined to a terminal one of said segments with a transverse living hinge, said transverse living hinges between each odd said segment and the next successive even said segment disposed on a front side of said elongated plate of material, said transverse living hinge between each even said segment and each successive odd said segment disposed on a reverse side of said elongated plate of material, said transverse living hinge joining said mounting plate to said terminal one of said segments disposed on said reverse side of said elongated plate of material where said mounting plate is even, said segments and said mounting plates thus accordion foldable into a short height collapsed state, said segments further provided with at least one longitudinal living hinge disposed on said front side of said elongated plate of material, said longitudinal living hinge displaced inwardly from a side edge of said segments, said longitudinal living hinge generating a narrow side portion, said longitudinal living hinge providing rigidity to said foldable extension arm upon displacing said narrow edge portion inwardly toward said front side after unfolding said segments.

20. The foldable extension arm as set forth in claim 19 wherein a last one of said segments is further provided with a locking tab joined to a terminal end thereof with a separate transverse living hinge, said mounting plate provided with a locking tab slot disposed into a joining end thereof, said locking tab slot narrower in width than said locking tab wherein said terminal end is locked to said last one of said foldable segments at an angle with respect to said last one segment of said foldable extension arm.

* * * * *